Dec. 20, 1960     G. MEUNIER ET AL     2,965,876
COMPENSATED SONIC ECHO RANGING SYSTEM
Filed Oct. 25, 1954     4 Sheets-Sheet 1

INVENTORS
Gaston Meunier
Claude Bruart
BY
Bailey, Stephens and Huettig
ATTORNEYS INVENTORS
Gaston Meunier
Claude Bruant
BY
Bailey, Stephens and Huettig
ATTORNEYS

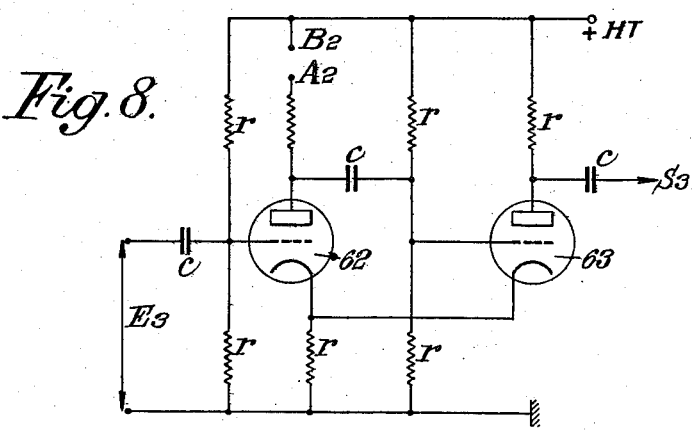
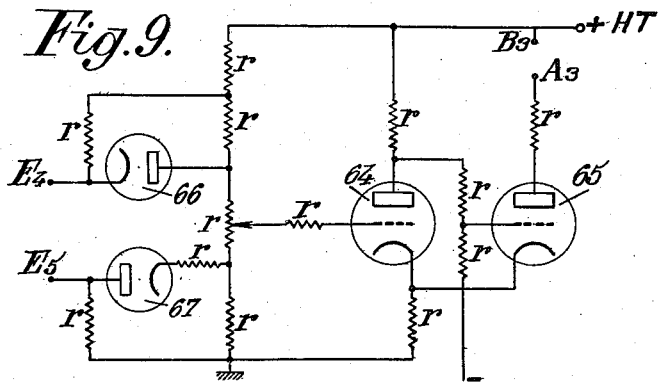
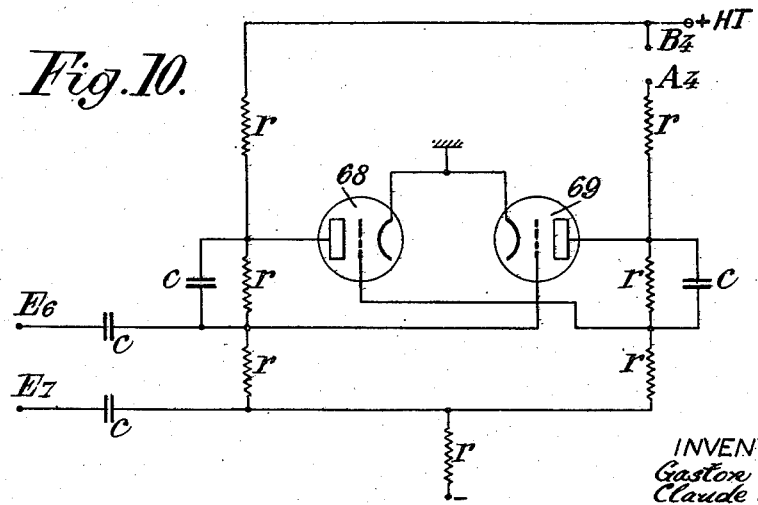

United States Patent Office

2,965,876
Patented Dec. 20, 1960

2,965,876

COMPENSATED SONIC ECHO RANGING SYSTEM

Gaston Meunier, Paris, and Claude Bruant, Montrouge, France; said Bruant assignor to Société Alsacienne de Constructions Mecaniques, a company of France Filed Oct. 25, 1954, Ser. No. 464,283

Claims priority, application France Oct. 31, 1953

5 Claims. (Cl. 340—3)

The present invention relates to sonar and similar devices and in particular to devices of this kind making use of sound or optical waves propagating in a stratified medium in which the variation of the velocity of a wave depends upon the height or depth of the layer of said medium in which said wave is travelling.

A chief object of our invention is to provide a device of this kind which is better adapted to meet the requirements of practice and in particular which is free from some particular causes of error and capable of determining the depth at relatively high distances. Furthermore, the devices according to our invention are intended to make it possible to know the trajectory of sound rays in said medium.

Preferred embodiments of the present invention will be hereinafter described with reference to the accompanying drawings given merely by way of example and in which:

Figs. 5 to 10 are part views showing in a detailed fashion some elements of the system of Fig. 4

Our invention is concerned with detecting and sounding devices making use of sonic or ultra-sonic waves and disposed for instance under the hull of ships or in their vicinity, and making it possible to detect bodies or obstacles located under said ships by measurement of the time elapsing between the transmission of a sound or ultra-sound pulse and its reception after reflection thereof on a body or obstacle.

However, these devices are subject to some errors which are caused in particular by the fact that these waves do not travel in a straight line due to variations of the conditions of propagation through different layers of the medium in which they are travelling. As a consequence of these errors, not only is the measured distance to an obstacle inaccurate but also the apparent direction may be different from the true direction.

Figures 1, 1A:
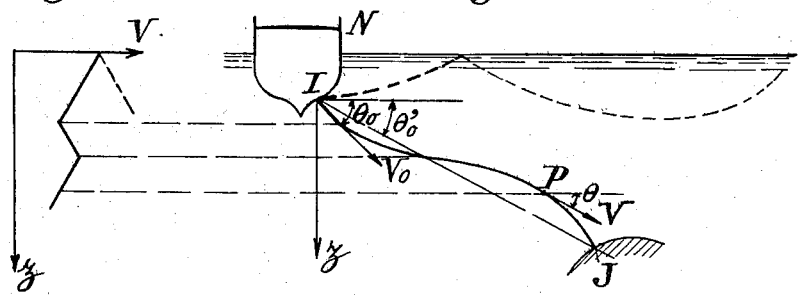
Fig. 1 is a diagrammatical view illustrating the shape of a sounding trajectory and Fig. 1a correspondingly shows the variation of velocity as a function of depth.

Fig. 1 shows a detecting device disposed at I at the lower part of a ship N and which transmits waves or pulses, for instance ultra-sonic ones in a direction indicated by angle $\theta_0$, but the path of travel of the wave is such, to reach the point J of the obstacle, that the true direction is in fact measured by angle $\theta'_0$. In this case, the trajectory is in the downward direction, but it might also be directed upwardly, as shown by the dotted lines, and it might even reach the surface S of the sea on which it would be reflected.

The deformation of the trajectory being due to variations of the conditions existing in successive sea layers, these conditions being for instance the pressure, the percentage of salt, the temperature, which may be measured in advance by a bathy-thermographic and salt percentage measuring sounding (said sounding being for instance expressed by a graph such as shown by Fig. 1a which gives the variation of velocity V in accordance with the depth or, in other words, determine the equation $v=f(z)$, the main object of our invention is to provide automatic means for calculating the trajectory from the conditions existing in the different sea layers and other known data, that is to say the position of the transmitter, the direction in which the wave is transmitted, the time of travel, said automatic means materializing a mathematical formula giving a particularly well approximated value of the quantity to be measured.

We will first explain how we conduct calculation in order to obtain such a formula.

If $V_0$ and $\theta_0$ are respectively the velocity of the wave and the angle of the direction of travel from transmitter I, V and $\theta$ the values of the same quantities at any point P, the laws of refraction are expressed as follows:

$$\cos \theta = \frac{\cos \theta_0}{V_0} \times V \qquad (1)$$

which is the formula of the curve of Fig. 1 and on the other hand, if z is the depth, ds the length of a small trajectory element and t the time:

$$dz = \sin \theta \, ds$$

or $$dz = \sin \theta V dt \qquad (2)$$

The expressions (1) and (2) fully define the trajectory. But if these equations were used in an automatic apparatus, the result would lack precision because $\cos \theta$ is very close to 1 for the slow inclinations of the trajectory which are commonly used.

It is therefore preferable to operate as follows:

Differentiation of Equation 1 gives:

$$\sin \theta \, d\theta = -\frac{\cos \theta_0}{V_0} dV$$

or $$\frac{d\theta}{ds} = -\frac{\cos \theta_0}{V_0} \frac{dV}{dz} \qquad (3)$$

because sin $$\theta = \frac{dz}{ds}$$

On the other hand, $ds = V dt$. If we admit that V varies but little, this expression $V dt$ may be replaced by $V_0 dt$, and in this case Equation 3 becomes:

$$\frac{d\theta}{dt} = -\cos \theta_0 \frac{dV}{dz} \qquad (4)$$

or $$\theta = \theta_0 - \cos \theta_0 \int_0^t \frac{dV}{dz} \cdot dt \qquad (5)$$

If the same approximation is admitted, Equation 2 may be written as follows:

$$z = V_0 \int_0^t \sin \theta \cdot dt \qquad (6)$$

Figure 2:
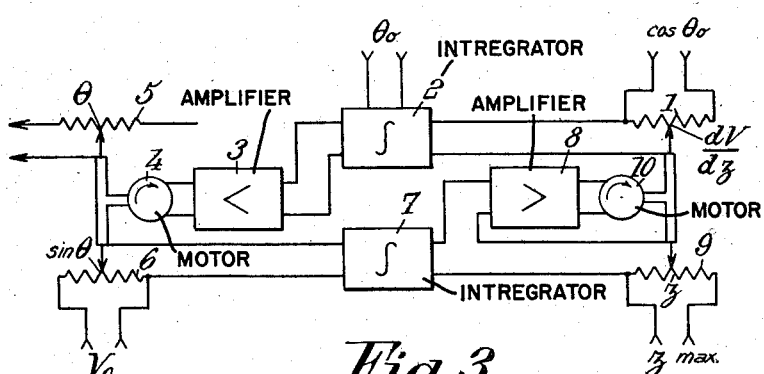
Fig. 2 shows the lay-out of a first embodiment of our invention.

According to a first embodiment of our invention, Equations 5 and 6 are used in the calculation device which must therefore include two integrators. This device may be purely mechanical but it is preferable to give it an electric form as shown by Fig. 2, that is to say to make use of electrical, electromagnetical and/or electronic parts or even magnetic parts as it will be hereinafter explained.

The device essentially comprises a combination of two integrators, including intermediate means such as amplifiers, for automatically calculating the depth on the basis of the above stated formulas, these elements operating, in accordance with the depth that is calculated, a potentiometer which in turn determines the operation of said integrators.

A potentiometer 1 constructed to supply a voltage proportional to $$\frac{dV}{dz}$$

at a given scale is fed with a current (constant for a given sounding) proportional to $\cos \theta_0$. The slider of the potentiometer being adjusted at the start on the corresponding value of $$\frac{dV}{dz}$$

(taken for instance from the graph of Fig. 1a), the voltage thus obtained is integrated according to Equation 5 by an integrator 2, preferably an electric one, of any known type, which also receives the value of $\theta_0$ as starting value of the integration. The output of integrator 2 is connected with an amplifier 3, for instance an electronic or magnetic one, which controls the current fed to a servo-motor 4 so that said servo-motor moves the slider of a potentiometer 5 which supplies voltages proportional to the values of $\theta$.

Another potentiometer 6 operated simultaneously and correspondingly by motor 4 and graduated in values of $\sin \theta$ is fed with a voltage proportional to $V_0$. Integrator 7 connected with the output of potentiometer 6 therefore integrates the expression $V_0 \sin \theta$, giving at its output an electric voltage proportional to $z$ (see Equation 6). This voltage is applied across one terminal of amplifier 8, which may be similar to amplifier 3, and one end of potentiometer 9.

The value $z$ thus obtained varies continuously, and a motor 10 the circuit of which is inserted between amplifier 8 and potentiometer 9 constantly moves both the slider of potentiometer 9 and, through suitable mechanical means, the slider of potentiometer 1. The desired value $z$ is that obtained when the echo signal reaches the transmitter.

According to modifications of this first construction, for small angles $\theta$ and $\sin \theta$ may be considered as practically equal, and in this case potentiometer 6 is identical to potentiometer 5. Alternately, in order to obtain a better approximation, there may be added to the $\theta$ term a $\theta^3$ term, which can be done with a nonlinear circuit.

According now to a second embodiment of our invention, Equation 6 is modified at the cost of a supplementary approximation in order more easily to evaluate the value of $\sin \theta$. For this purpose, we take the expression:

$$\sin \theta = \sin \theta_0 + \cos \theta_0 \int_{\theta_0}^{\theta} d\theta = \sin \theta_0 - \cos^2 \theta_0 \int_0^t \frac{dV}{dz} \cdot dt$$

which is tantamount to supposing that the variations of $\cos \theta$ are small and may be neglected; comparing with the Equation 4 we obtain:

$$\sin \theta = \sin \theta_0 - \cos^2 \theta_0 \int_0^t \frac{dV}{dz} \cdot dt$$

and by transferring this value in Equation 6 we finally obtain:

$$z = V_0 \sin \theta_0 \times T - V_0 \cos^2 \theta_0 \iint_0^T \frac{dV}{dz} dt^2 \quad (7)$$

In this equation, the first term $V_0 \sin \theta_0 \times T$ represents what may be called the apparent immersion and the second one the correction of immersion.

According to this embodiment, the device includes, as in the construction above described, two simple integrators (in order to calculate the double integral of Equation 7) and a potentiometer giving a continuous variation as a function of $z$. The slider of this potentiometer moves at any time in accordance with the value of the depth which has been calculated by two integrations. On Fig. 3, the same reference numerals as those used on Fig. 2 have been used for the parts playing similar functions. Thus, potentiometer 1 which, in the construction of Fig. 2, was graduated in values of $$\frac{dV}{dz}$$

is in this case graduated in values of $$V_0 \frac{dV}{dz}$$

The electric magnitude it supplies (voltage or current) may be applied to a potentiometer 11 graduated in values of the square of the cosine of an angle the value of which is introduced by adjustment of the slider of said potentiometer 11. As said slider is adjusted proportionally to the value of $\theta_0$, a voltage proportional to the product $$\cos^2 \theta_0 \cdot V_0 \frac{dV}{dz}$$

is supplied to integrator 2. At the same time, potentiometer 12 which has its slider operatively connected with that of 11, supplies a voltage proportional to $V_0 \sin \theta_0$, whereby these two magnitudes can be combined in integrator 7 to supply the depth $z$, according to Equation 7. As in the case of Fig. 2, potentiometer 9 has its slider moved by a motor 10 driven by current fed through amplifier 8.

If it is desired to trace the curve of the trajectory with some accuracy, not only is the stylus of the recording device driven by motor 10 placed under the dependence of the value of the depth perpendicular to the record strip as obtained by one of the above described systems, but furthermore the unwinding of said strip is to take place in accordance with the horizontal displacement, that is to say $$V_0 \int_0^T \cos \theta \, dt$$

Of course, the examples above stated are somewhat diagrammatic and are chiefly intended to disclose the fundamental principles of our invention. There may be many different practical constructions. In particular, the electric integrators might be of the so-called "digital" type or be replaced by mechanical integrators or by electromechanical integrators by means of a velodyne or of a similar part the speed of revolution of which depends upon the magnitude to be integrated. We might also replace the combination of elements 9, 10, 13 by a mere measurement apparatus of the frame voltmeter type with a low time constant, and capable of varying the magnitudes $$\frac{dV}{dz}$$

A construction corresponding to the lay-out of Fig. 3 will now be described in a more detailed fashion. In this construction, the problem is simplified by giving magnitudes $$\frac{dV}{dz}$$

which may be called "velocity gradients" or simply

"gradients," a finite number of given values corresponding to layers having depths equal to $z_1$, $z_2$, etc. The above mentioned apparatus of the voltmeter kind will be advantageously replaced by a cathode-ray tube the beam of which is moved in accordance with the elapsed time, whereby the shape of the trajectory is directly visible on the screen. Preferably, we use an electronic arrangement to supply the gradient voltages which correspond to the depth voltages (in order to avoid the use of a system where switching is directly or indirectly controlled by means such as relays or circuit-breakers of a suitable type). For instance, said gradients may be shifted by tubes having respective threshold or critical factors of operation adjusted in accordance with the depths at which the gradients change.

Figure 3:
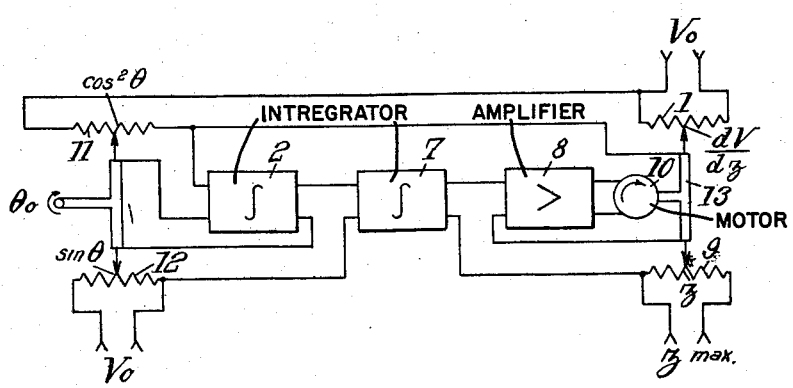
Fig. 3 shows the lay-out of another embodiment of our invention.
Figure 4:
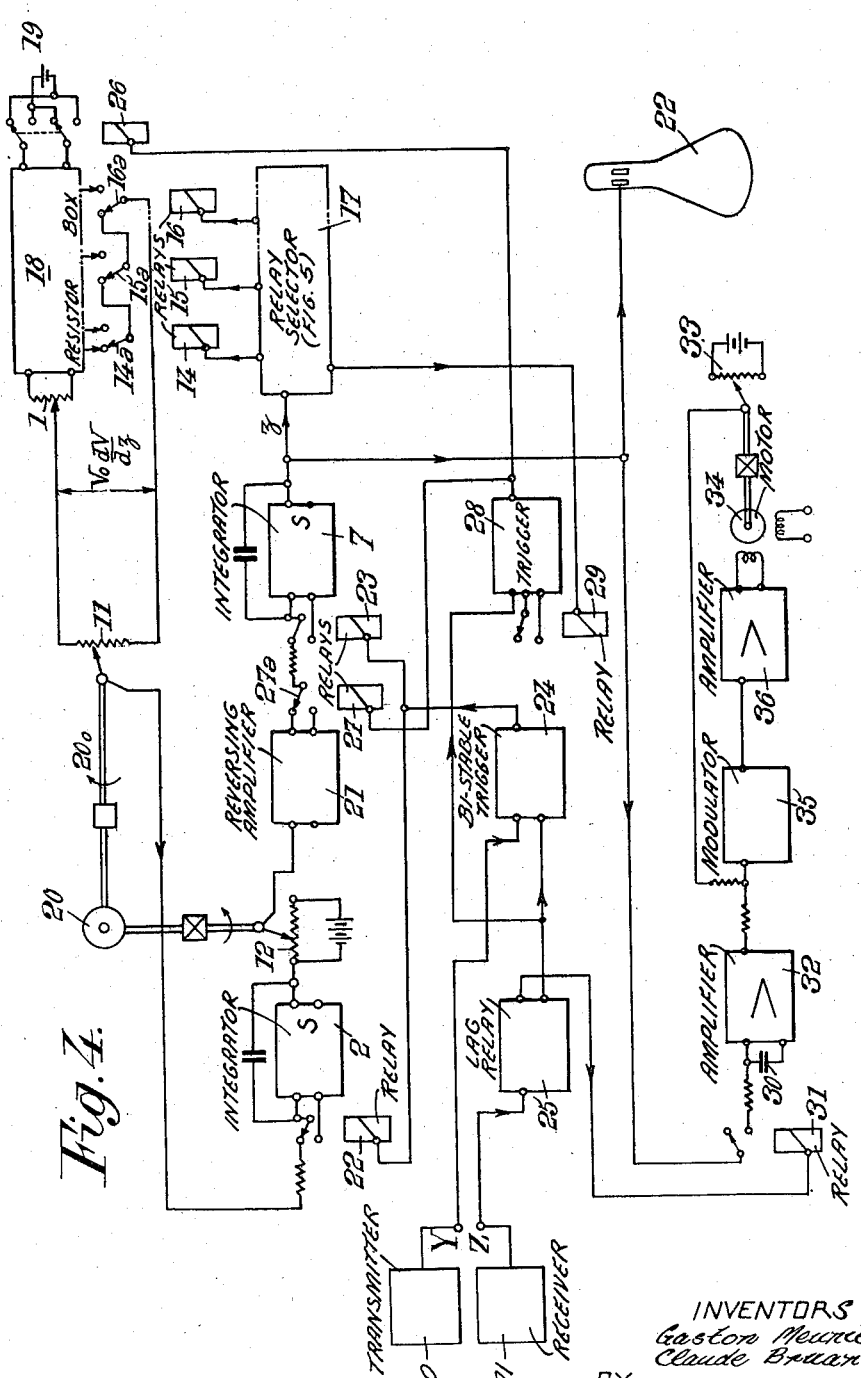
Fig. 4 illustrates in a more detailed fashion a construction according to the embodiment of Fig. 3.

In Fig. 4, elements 1, 2, 8, 11, 12 correspond to the same elements as on Fig. 3, but shifting from one discontinuous gradient to another one, instead of being performed by motor 10, is performed by a system of relays three of which, 14, 15, 16 have been shown on the drawing. These relays are operated by an electronic device 17 acting as a selector which brings them into play when it is fed with respective threshold or ocritical voltages so that it is controlled on the one hand by the automatically calculated magnitude z and, on the other hand, by the different values of z chosen to correspond to gradient shifting.

18 represents a potentiometric resistor box of suitable construction supplied with current from a source 19 and comprising resistor combinations for entering the values of the velocity gradients (corresponding respectively to the values of z) brought into play by contact blades such as 14a, 15a, 16a under the action of the corresponding relays 14, 15, 16 (which are closed when the corresponding magnitudes z are reached, as it will be explained hereinafter).

Voltage $$V_0 \frac{dV}{dz}$$

obtained at the output of device 18 is fed to a potentiometer 11 the output voltage of which varies proportionally to the function $$\frac{1+\cos \alpha}{2}$$

of an angle $\alpha$ proportional to the displacement of the potentiometer slider. Said slider is initially adjusted by rotation of piece 20 to a position corresponding to a value of said angle $\alpha$ equal to 2 $\theta_0$. Since:

$$\cos^2 \theta_0 = \frac{1+\cos 2\theta_0}{2}$$

we therefore obtain at the output of potentiometer 11 a term proportional to $$V_0 \cos^2 \theta_0 \frac{dV}{dz}$$

which term is introduced into electronic integrator 2.

Part 20 also adjusts the slider of potentiometer 12 but proportionally to only an angle $\theta_0$, and this potentiometer has an output voltage proportional to the sine of this angle, thus giving a term proportional to $V_0 \sin \theta_0$ whereby it is possible to add the two terms thus formed which correspond to those of Equation 7, then to integrate them in an integrator 7, the intermediate amplifier 21 being for the present time not inserted in the circuit. Integrator 7 finally supplies the desired depth z. This depth, on the one hand controls part 17 and, on the other hand, is disclosed on the screen of cathode-ray tube 22 only one of the pairs of deflecting plates of which has been shown on the drawing.

Piloting of the chain of relays 14 to 16 in accordance with the data of the sonar device essentially includes the following operations:

On the one hand, entry of datum $\theta_0$ obtained, as above stated, by means of part 20 which reproduces the directional movements of the ultra-sound transmitter owing to any suitable connection;

On the other hand, starting of integrators 2 and 7 when the pulse is transmitted and stopping thereof when the echo is received.

Release of the integrators so that they can start working when the ultra-sound pulse is transmitted is obtained by the opening of the contacts of relays 22 and 23 controlled by a Kipp relay or bistable trigger circuit 24. For this purpose, said device 24 is controlled by a Y signal coming from the transmitter 70 of the sonar device.

Stopping of said integrators when the echo is received so as to end the integration operation and to return the integrators to zero before the next transmission takes place when relays 22 and 23 are closed by device 24. For this purpose, device 24 is attacked after a slight lag by a trigger device 25, acting as a lag relay, itself piloted by the echo signal Z delivered by the receiver 71 of the sonar device. The slight lag thus introduced is deliberate and corresponds to the time for which the result of the calculation is preserved in order to make use thereof.

Furthermore, it is necessary to provide for the case where the trajectory strikes the surface of the sea (as shown in dotted lines on Fig. 1), which produces a reflection. If the device did not take this case into account, trajectories would be obtained which would seem to get out of the surface of water, which is of course impossible. This is why we provide means for simultaneously reversing the voltage fed at 19 to device 18 and also the voltage supplied to integrator 7.

The corresponding switching is respectively performed by relays 26 and 27. A reversed voltage is obtained in amplifier 21 which works as a reversing device inserted in the chain ahead of the second integrator 7. Relays 26 and 27 are controlled by a trigger circuit 28 the operation of which takes place every time the magnitude z that is calculated becomes zero. This passage through zero is detected by the first stage (tube 40) of the electronic control device 17. It is this device which pilots device 28 through relay 29. On the other hand, whatever be its position after every transmission, device 28 is set back in correct starting position by the echo signal applied at Z and delayed through trigger device 25 (or through suitable analogous means not shown and which for instance include an auxiliary contact working in case of the absence of an echo).

As above stated, the trajectory of the sound ray is traced on the screen of the cathode-ray tube and for this purpose known means, in connection for instance with a second pair of deflecting plates (not shown) are adapted to be started by the signal transmission, supplying a horizontal deflection proportional to time. We thus obtain an approximation very close to what actually takes place. At the cost of a supplementary complication and through means analogous to those above described, we might also obtain a more accurate horizontal deflection equal to $$V_0 \int_0^T \cos \theta \, dt$$

It is further useful to transmit the depth thus calculated to a motor device, for instance a selsyn connection, capable of exerting a substantial torque and the displacements of which (in particular the rotations of which) follow the depth automatically calculated.

For this purpose:

A condenser 30 is charged at a voltage equal to that representing z at the time of the echo. This takes place owing to relay 31 which is closed for a very short time when the echo is received. For this purpose, it is controlled by a circuit of trigger device 25 which has no lag with respect to the echo.

The voltage of condenser 30, amplified by an amplifier 32, is opposed to a voltage supplied by a potentiometer 33 the slider element of which is actuated by a two-phase motor 34, itself controlled by the difference of said opposed voltages, through a modulator 35 which receives the differential voltage and transforms it into an alternative error voltage, and a transmitting amplifier 36. Consequently, motor 34 turns until the opposed voltages are equal, driving the slider of potentiometer 33, and the motor can drive any suitable mechanism depending upon the depth z and according to the variations of this depth.

We will now describe in a more detailed fashion some of the elements of the apparatus.

Figure 5:
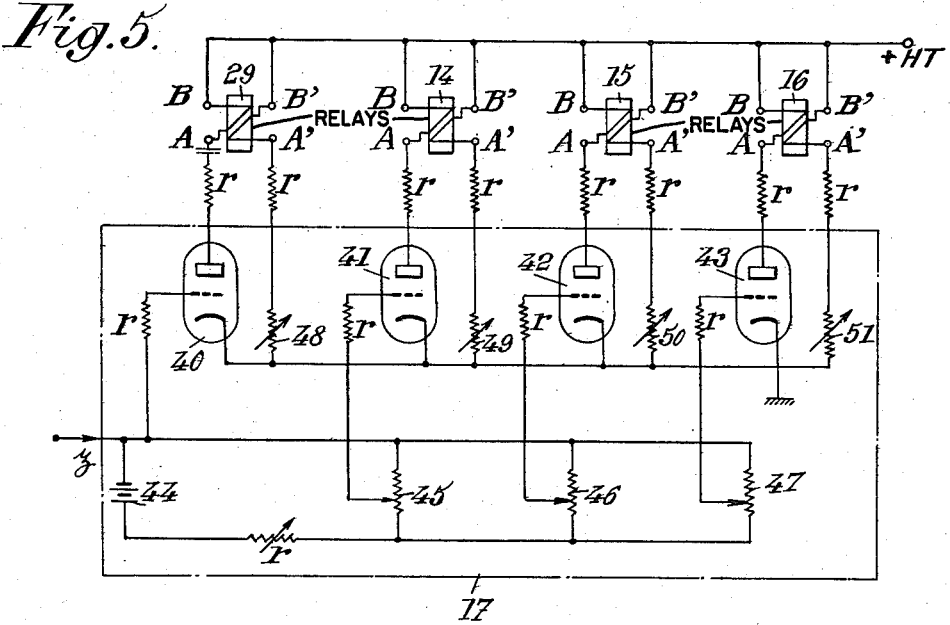

Device 17 may be made as shown by Fig. 5 and it includes tubes 41–43 arranged to control relays 14–16 respectively. Said relays have two windings inserted respectively at AB and A'B'. The control voltage which represents the depth z is always positive and it is transmitted to the control grid of the first tube the threshold voltage of which corresponds to $z=0$. Due to the effect of bias source 44 and of potentiometers 45, 46, 47 which serve to enter the values of the depths that have been chosen for the layers within which the velocity gradients are supposed to have fixed values, the threshold voltages of tubes 41, 42, 43 correspond to these depths. The normal winding of every relay is shown at AB; the second winding at A'B' makes its possible to adjust the threshold voltages by means of variable resistances such as 48–51. The resistors are all designated by the same reference numerals r.

Figure 6:
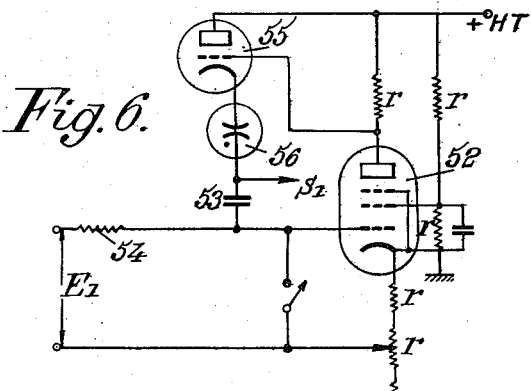

Integrators 2 and 7 may be identical and made as shown by Fig. 6. They include a tube 52, preferably a high gain amplifier pentode 52, having a negative feedback differentiator circuit including in series condenser 53, resistor 54, amplifier triode 55 and neon tube 56. The input voltage is applied at $E_1$. Tube 55 serves to supply current to neon tube 56 and to reset the integrator to zero, whereas the neon tube makes it possible to modify the absolute value of the output voltage collected at $S_1$ with respect to the ground.

Figure 7:
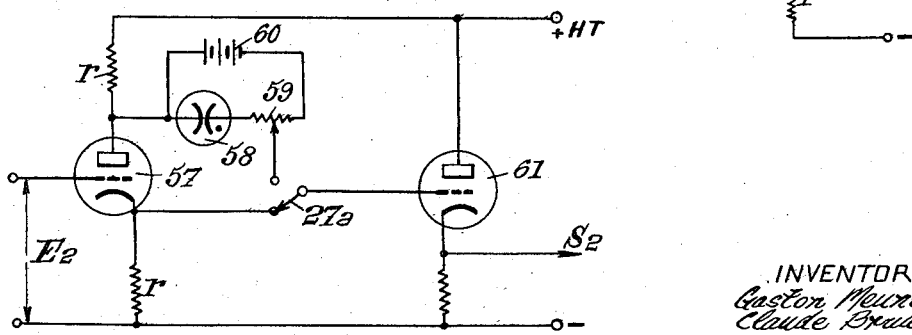

The reversing amplifier 21 may be made as shown by Fig. 7. It comprises two stages. The first stage, including a tube 57, has its load divided between the plate circuit and the cathode circuit. The neon tube 58 associated with potentiometer 59 and battery 60 makes it possible as above to modify the absolute value of the output voltage. The second stage, including tube 61, merely constitutes a separator. Contact 27a is operated by relay 27 and replaces in this case the contact 27a of Fig. 4.

Device 25 may be made as shown by Fig. 8 where it is constituted by a one shot Schmidt trigger circuit including two tubes 62 and 63. This device may be triggered by a signal applied at $E_3$. The relay 31 of Fig. 4 is inserted in the plate circuit of tube 62, between the terminals $A_2$ and $B_2$ and it works practically in an instantaneous fashion when the trigger signal is applied at $E_3$.

In the plate circuit of tube 63, there is obtained at $S_3$ a negative signal appearing at the time when the trigger device is returned to zero, that is to say with some lag with respect to the starting signal.

Trigger device 24 may be made according to the diagram of Fig. 9 which represents a flip-flop device with two tubes 64 and 65 forming a Schmidt trigger circuit.

Operation of this device in one direction is obtained by a trigger signal negative with respect to the ground applied at $E_4$ and passed through a rectifier 66, whereas operation in the other direction is obtained by the application of a positive trigger signal applied at $E_5$ and passed through a rectifier 67. Relays 22 and 23 are inserted between terminals $A_3$, $B_3$ in the plate circuit of tube 65.

Finally, trigger device 28 may be made as shown by Fig. 10 which shows a conventional "Eccles-Jordan" circuit with two tubes 68, 69. This device may be triggered in two different ways:

For a signal applied at $E_7$, the trigger device always passes from one of its stable positions to the other one, whatever be the starting position;

For a signal applied at $E_6$, the trigger device comes back to a predetermined stable position if it were not already in this position, or remains in this position.

The signal applied at $E_6$ is the echo signal Z. At $E_7$ we apply a signal by the closing of relay contacts 29 every time depth z reaches value zero. Reversing relays 26 and 27 are inserted between the terminals $A_4$, $B_4$ of the plate circuit of tube 69.

Of course, the lay-outs of Figs. 5 to 10 are given merely by way of example.

In the following claims the expression "sound" is meant to apply both to audible sounds and to ultra-sounds.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. An apparatus for automatically determining at least one coordinate of a sound pulse travelling in a mass of water in which the velocity $V_0$ of said pulse for every value of the depth z at which it is travelling is represented by the relation $V=f(z)$, which apparatus comprises, in combination, means for transmitting a sound pulse in said mass of water, a first potentiometer including a resistor and a slider, the input of said potentiometer being between the ends of said resistor and the output between said slider and one end of said resistor, the output resistance of said first potentiometer being proportional to $$\frac{dV}{dz}$$

for displacement of said slider proportional to depth z, means for feeding the input of said potentiometer with a voltage proportional to the initial velocity $V_0$ of said pulse as it is being transmitted, whereby the output voltage of said potentiometer is proportional to $$V_0 \frac{dV}{dz}$$

said slider being adjustable so that it can initially be given a position on said resistor corresponding to $z=0$, a second potentiometer including a slider and a resistor in series with the output of said first mentioned potentiometer, the output of said second mentioned potentiometer being between said last mentioned slider and one end of said last mentioned resistor, said last mentioned resistor having its resistance so distributed along its length that the value of the resistance between said last mentioned resistor end and said last mentioned slider, for any value of the distance $\theta_0$ between said last mentioned resistor end and said last mentioned slider, is constantly equal to $\cos^2 \theta_0$, said last mentioned slider being adjustable along said last mentioned resistor so that it can initially be given a position on said resistor for which $\theta_0$ is proportional to the angle made by the direction of transmission of said pulse with the plane of the surface of said mass of water, whereby the voltage across the output of said second mentioned potentiometer is proportional to $$\cos^2 \theta_0 V_0 \frac{dV}{dz}$$

an electrical integrator means having its input connected with the output of said second mentioned potentiometer to supply at its output a voltage proportional to $$\cos^2 \theta_0 V_0 \int_0^t \frac{dV}{dz} dt$$

a third potentiometer including a resistor and a slider operatively connected with said second mentioned slider so as to be movable therewith, the output of said third mentioned potentiometer being between its slider and one end of said last mentioned resistor, said last mentioned resistor having its resistance so distributed along its length that the value of the resistance between said last mentioned resistor end and said last mentioned slider is constantly equal to sin $\theta_0$, means for supplying a voltage proportional to $V_0$ between the ends of said last mentioned resistor, whereby the voltage at the output of said third mentioned potentiometer is proportional to $V_0 \sin \theta_0$, a second electrical integrator means, means for connecting the input of said second mentioned integrator means with both of the outputs of said first mentioned integrator and said third mentioned potentiometer connected in series, said second mentioned integrator means being arranged to supply at its output a voltage proportional to $$V_0 \sin \theta_0 T - V_0 \cos^2 \theta_0 \iint_0^T \frac{dV}{dz} dt^2$$

and indicative at any time of depth $z$, electric motor means connected with the output of said second mentioned integrator means for moving the slider of said first mentioned potentiometer proportionally to said last mentioned voltage, means operative by said transmitting means for automatically starting both of said integrator means upon transmission of a pulse, and means operative in response to reception of the echo of said pulse for automatically stopping both of said integrator means.

2. An apparatus for automatically determining at least one coordinate of a sound pulse travelling in a mass of water in which the velocity $V_0$ of said pulse for every value of the depth $z$ at which it is travelling is represented by the relation $V=f(z)$, which apparatus comprises, in combination, means for transmitting a sound pulse in said mass of water, a first potentiometer including resistor means and control means for varying the resistance of said resistor means, means for feeding the input of said potentiometer with a voltage proportional to the initial velocity of said pulse as it is being transmitted, the output voltage of said first potentiometer means being proportional to $$V_0 \frac{dV}{dz}$$

said first potentiometer means being adjustable to give a value of V corresponding to $z=0$, a second potentiometer including a slider and a resistor in series with the output of said first mentioned potentiometer, the output of said second mentioned potentiometer being between said last mentioned slider and one end of said last mentioned resistor, said last mentioned resistor having its resistance so distributed along its length that the value of the resistance between said last mentioned resistor end and said last mentioned slider, for any value of the distance $\theta_0$ between said last mentioned resistor end and said last mentioned slider, is constantly equal to $\cos^2 \theta_0$, said last mentioned slider being adjustable along said last mentioned resistor so that it can initially be given a position on said resistor for which $\theta_0$ is proportional to the angle made by the direction of transmission of said pulse with the plane of the surface of said mass of water, whereby the voltage across the output of said second mentioned potentiometer is proportional to $$\cos^2 \theta_0 V_0 \frac{dV}{dz}$$

an electrical integrator means having its input connected with the output of said second mentioned potentiometer to supply at its output a voltage proportional to $$\cos^2 \theta_0 V_0 \int_0^t \frac{dV}{dz} dt$$

a third potentiometer including a resistor and a slider operatively connected with said second meentioned slider so as to be movable therewith, the output of said third mentioned potentiometer being between its slider and one end of said last mentioned resistor, said last mentioned resistor having its resistance so distributed along its length that the value of the resistance between said last mentioned resistor end and said last mentioned slider is constantly equal to sin $\theta_0$, means for supplying a voltage proportional to $V_0$ between the ends of said last mentioned resistor, whereby the voltage at the output of said third mentioned potentiometer is proportional to $V_0 \sin \theta_0$, a second electrical integrator means, means for connecting the input of said second mentioned integrator means with both of the outputs of said first mentioned integrator and said third mentioned potentiometer connected in series, said second mentioned integrator means bein arranged to supply at its output a voltage proportional to $$V_0 \sin \theta_0 T - V_0 \cos^2 \theta_0 \iint_0^T \frac{dV}{dz} dt^2$$

and indicative at any time of depth $z$, means for applying said last mentioned voltage to said control means, whereby said first mentioned potentiometer is operated in accordance with the variations of $z$, means operative by said transmitting means for automatically starting both of said integrator means upon transmission of a pulse, and means operative in response to reception of the echo of said pulse for automatically stopping both of said integrator means.

3. An apparatus according to claim 2 in which said control means include a plurality of relays for varying said resistor means and an electronic device having as many stages to operate said relays respectively, said relays corresponding to as many depth ranges inside each of which the pulse velocity is considered as constant, each of said stages being operative from a different threshold voltage value.

4. An apparatus according to claim 2 further including motor means fed from said second mentioned integrator.

5. An apparatus according to claim 2 further including, between said two integrators, a reversing amplifier, normally short-circuited, and means, responsive to variation of the last mentioned voltage, for bringing said amplifier into action when said voltage becomes zero.

References Cited in the file of this patent
UNITED STATES PATENTS
2,760,180    Sipkin _____ Aug. 21, 1956